United States Patent
Winkler et al.

(10) Patent No.: US 7,316,153 B2
(45) Date of Patent: Jan. 8, 2008

(54) METHOD, APPARATUS, AND COMPUTER PROGRAM FOR MEASURING THE LEAKAGE FROM FUEL INJECTION SYSTEMS FOR INTERNAL COMBUSTION ENGINE

(75) Inventors: Jochen Winkler, Esslingen (DE); Markus-Ulrich Wehner, Karlsruhe (DE); Thorsten Sommer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/547,707

(22) PCT Filed: Oct. 7, 2003

(86) PCT No.: PCT/DE03/03322
§ 371 (c)(1),
(2), (4) Date: Sep. 2, 2005

(87) PCT Pub. No.: WO2004/079321
PCT Pub. Date: Sep. 16, 2004

(65) Prior Publication Data
US 2006/0179921 A1    Aug. 17, 2006

(30) Foreign Application Priority Data
Mar. 5, 2003 (DE) ................ 103 09 440

(51) Int. Cl.
*G01M 3/04* (2006.01)
*G01M 15/00* (2006.01)

(52) U.S. Cl. ........................... 73/40; 73/119 A
(58) Field of Classification Search ............. 73/119 A, 73/40, 47, 117.1; 123/205, 445
See application file for complete search history.

(56) References Cited

U.S. PATENT DOCUMENTS

| | | | | |
|---|---|---|---|---|
| 1,439,932 A | * | 12/1922 | Warren | 123/59.1 |
| 5,773,716 A | * | 6/1998 | Antonioli et al. | 73/119 A |
| 5,817,923 A | * | 10/1998 | Ohsaki et al. | 73/35.02 |
| 5,834,631 A | | 11/1998 | Yamaguti et al. | 73/40 |
| 2003/0140686 A1 | * | 7/2003 | Bindel et al. | 73/119 A |
| 2003/0145648 A1 | * | 8/2003 | Unger et al. | 73/118.1 |
| 2003/0150259 A1 | | 8/2003 | Unger et al. | 73/119 A |

FOREIGN PATENT DOCUMENTS

| | | |
|---|---|---|
| DE | 43 21 709 A1 | 1/1994 |
| DE | 198 09 926 A1 | 9/1999 |
| WO | WO 02/054038 A2 | 7/2002 |

M

* cited by examinerM

*Primary Examiner*—Daniel S. Larkin
*Assistant Examiner*—Tamiko Bellamy
(74) *Attorney, Agent, or Firm*—Ronald E. Greigg

(57) ABSTRACT

A method for ascertaining the leakage from injection systems is proposed which is fully automatable and which furnishes unambiguous measurement results, which make a simple decision possible about the tightness of an injection system, in particular of an injector or of an injection valve.

19 Claims, 2 Drawing Sheets

METHOD, APPARATUS, AND COMPUTER PROGRAM FOR MEASURING THE LEAKAGE FROM FUEL INJECTION SYSTEMS FOR INTERNAL COMBUSTION ENGINE

CROSS-REFERENCE TO RELATED APPLICATIONS

This application is a 35 USC 371 application of PCT/DE 03/03322 filed on Oct. 7, 2003.

BACKGROUND OF THE INVENTION

1. Field of the Invention

This invention is directed to an improved method of measuring the leakage fuel from fuel injection systems, and to apparatus and a computer program for use in the method.

2. Prior Art

Fuel injection systems for internal combustion engines and their components, such as common rail injectors, must be leakproof in operation. Moreover, they must be leakproof even when the engine is shut off, to prevent fuel from emerging from the injection systems or the injectors and possibly being a threat to persons, to the engine, or to the environment. The tightness testing required for this before the injection systems are shipped to the customer has been done until now by visual testing, once the injection system has been subjected to a test pressure for a certain length of time. This visual testing is a subjective measurement method that cannot be quantified and that sometimes leads to results that depend on the person performing the test. Moreover, the result of the tightness testing cannot be quantified.

OBJECTS AND ADVANTAGES OF THE INVENTION

The object of the invention is to furnish an automatable method, which produces objective measurement results and which on the basis of predeterminable limit values leads to an unambiguous result as to whether a tested injector or an injection valve is leakproof, or not.

According to the invention, this object is attained by a method for measuring the leakage from injection systems, in particular for internal combustion engines of motor vehicles and in particular in production testing, in which the injection system, in particular injectors or injection nozzles, is connected to a measurement chamber; a test fluid is introduced into the measurement chamber; the pressure in the injection system or in the measurement chamber is varied; subsequently or simultaneously, the motion of a piston that at least in some regions defines the measurement chamber is detected by a detection device; and the measurement signals furnished by the detection device are evaluated.

According to the invention, this object is also attained by a method for measuring the leakage from injection systems, in particular for internal combustion engines of motor vehicles and in particular in production testing, in which the injection system, in particular injectors or injection nozzles, is connected to a measurement chamber; a test fluid is introduced into the measurement chamber; subsequently or simultaneously, the motion of a piston that at least in some regions defines the measurement chamber is detected by a detection device; and subsequently at least one measurement signal furnished by the detection device is evaluated by comparison with at least one reference value.

These methods are relatively simple in terms of their sequence and are therefore readily automatable. Moreover, by a comparison of the measurement signals at various pressures, or by comparison of them with a reference value, any leakage that might occur is quantifiable, and in conjunction with a predeterminable limit value, the decision can automatically be made whether the tested injection system can be considered tight, or not. Automating the tightness testing economizes on cost, and the quality of the products shipped increases, since mistakes in the tightness testing can be precluded.

The method according to the invention can be further simplified if the test fluid is introduced into the measurement chamber from the injection system or the injector or the injection nozzle, since these injection systems and injection components are intended anyway for injecting metered quantities of fuel into the combustion chamber of an internal combustion engine. The functionalities required for introducing a test fluid into the measurement chamber are therefore already present anyway.

The evaluation of the automated tightness testing can be improved still further if a chronological series of the measurement signals furnished by the detection device is evaluated by comparison with a chronological series of reference values.

The conclusiveness of the tightness testing performed by the method of the invention can moreover be further enhanced by varying the test pressure $p_{test}$ prevailing in the injection system and evaluating at least one measurement signal, furnished by the detection device, for each pressure. It is understood that this feature of the method may also be employed in conjunction with the detection of a chronological series of measured values.

From the evaluation of various chronological series of measured values that have been picked up at various test pressures, the cause of any leak in the injection system that might occur can possibly already be detected, making the ensuing correction of the defect easier.

The object of the invention is also attained by an apparatus for measuring the leakage from injection systems, in particular injectors and injection nozzles, for internal combustion engines, particularly in production testing, having a measurement chamber into which a test fluid can be injected from the injection system, having a piston that at least in some regions defines the measurement chamber, the piston being prestressed counter to the test fluid, and having a detection device which detects a motion of the piston and furnishes a corresponding measurement signal, or a chronological series of measurement signals, in that it is employed for performing one of the methods of the invention.

From German Patent DE 100 64 511 C2, a so-called IQI (injection quantity indicator) is known. This IQI comprises a housing in which a piston is guided. The interiors of the housing and of the piston define a measurement chamber. The measurement chamber has an opening, at which an injection system, such as an injector with an injection nozzle, can be inserted in pressure-tight fashion. If the injection system injects fuel into the measurement chamber, a fluid located in the measurement chamber is positively displaced. As a result, the piston moves, which is detected by a travel sensor. From the travel of the piston, a conclusion can be made about the change in volume of the measurement chamber or in the volume of the fluid contained there, and as a result about the quantity of fuel injected.

For measuring the motion of the piston, in the known injection quantity indicator, measurement is done with an arrangement comprising a measuring tappet and an inductive travel measuring system. The measuring tappet is embodied as a feeler or is solidly connected to the piston. Upon a motion of the piston, the measuring tappet is thus also put into motion, and finally the motion of the measuring tappet is detected, and a corresponding signal is forwarded to an evaluation unit.

These injection quantity indicators are used for high-precision measurement of the quantity of fuel injected under certain conditions by an injection system, in particular an injector or an injection nozzle. Since the injection quantity indicators have all the requisite characteristics for testing the method of the invention for testing the tightness of injection systems, in particular injectors or injection nozzles, it is recommended that these injection quantity indicators also be used for performing the method of the invention. This has additional major commercial advantages: First, a new apparatus does not have to be manufactured for performing the method of the invention, and furthermore, the injection quantity testing and the tightness testing of an injection system can be done in a vise and in succession in the same apparatus, namely the injection quantity indicator. As a result, outfitting and shipping times are eliminated, and manipulating the course of testing an injection system is simplified considerably. All in all, this leads to considerable commercial advantages because of the transition from visual testing to the method that according to the invention can be automated for testing the tightness of injection systems.

The injection quantity indicator used for performing the method of the invention may include a damping device which at least intermittently damps the motion of the piston. It is advantageous if the degree of damping of the damping device is chronologically adjustable, and particularly if the degree of damping is triggerable by a open- and closed-loop control device, so that even the control of the degree of damping can be done in fully automated fashion and thus without additional costs.

To attain comparable test results, it is recommended that the piston be prestressed counter to the test fluid by means of a helical spring. Alternatively or in addition, the piston can also be subjected to a gas pressure. Given a known spring rate and a known gas pressure, the pressure in the measurement chamber can readily be calculated, and from the measured quantity of leakage, a conclusion can be made about the tightness or lack of tightness of the injection system tested.

The invention finally also relates to a computer program, which is suitable for performing the above method when it is performed on a computer. It is especially preferred if the computer program is stored in a memory, in particular a flash memory.

BRIEF DESCRIPTION OF THE DRAWINGS

One exemplary embodiment of the invention is described in detail below, in conjunction with the accompanying drawings, in which.

DESCRIPTION OF THE PREFERRED EMBODIMENT

Figure 1:
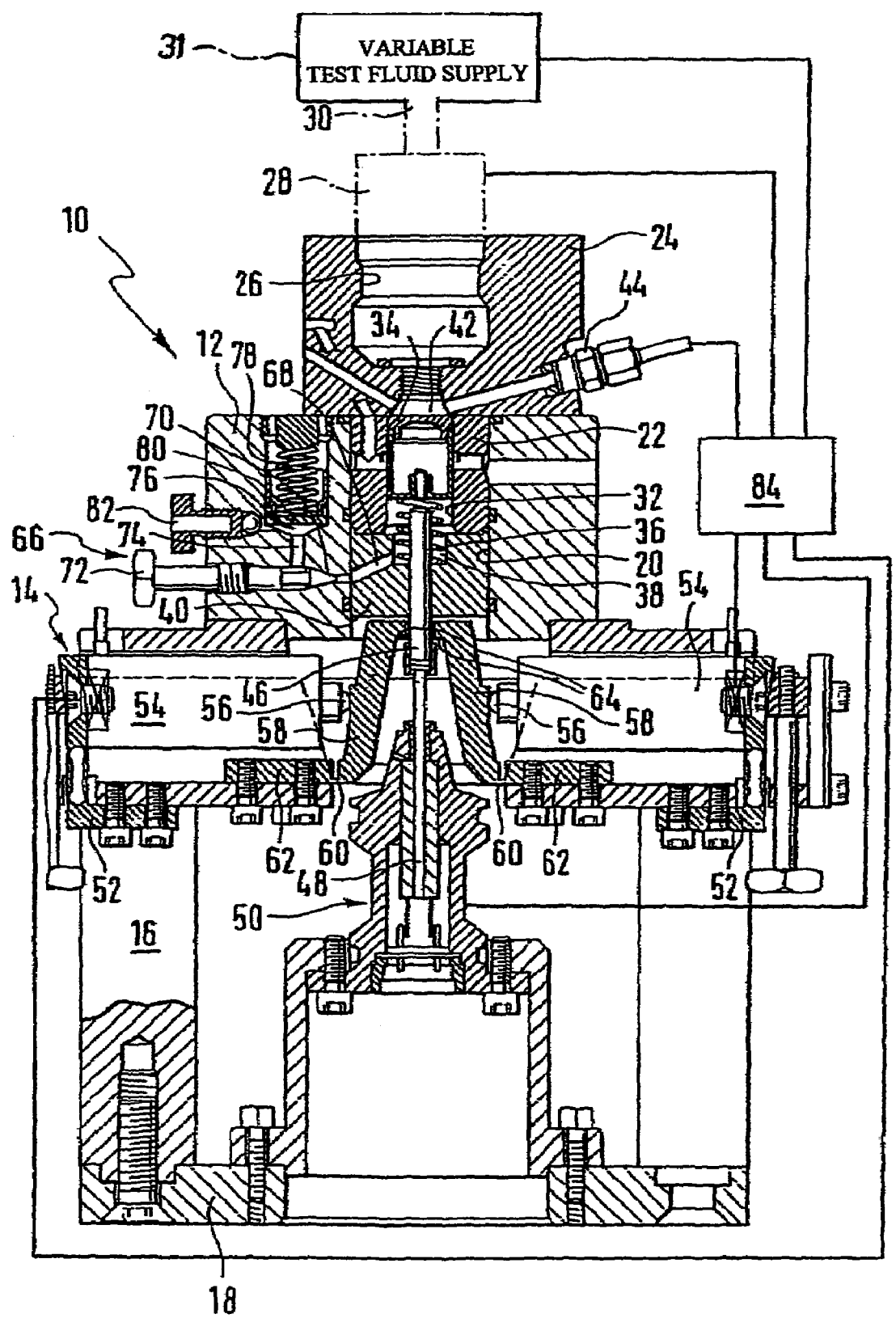
FIG. 1 shows a section through an apparatus for measuring the injection quantity of injection systems for internal combustion engines, with a damping device.

In FIG. 1, an apparatus for measuring the injection quantity in injection systems is identified overall by reference numeral 10. It includes a centrally located body 12 that is seated on a damping device 14 which in turn is retained on a sleeve 16. This sleeve stands on a bottom plate 18, which is anchored to a base. A substantially central bore 20 is made in the central body 12. A cylindrical insert 22 is inserted into the upper portion of this bore and is sealed off from the central body 12 by way of 0-ring seals (not identified by reference numerals). A head 24 is placed in pressure-tight fashion on the insert 22, and a stepped bore 26 is made in the head and, in the assembled state shown in FIG. 1, extends coaxially to the bore 20 in the central body 12.

An adapter 28 is inserted into the stepped bore 26 and sealed off from the stepped bore 26. An injection system, in the present case an injector 30 with its injection nozzle (not identified by reference numeral), is inserted into the adapter 28. The injector 30 communicates in turn with a variable high-pressure test fluid supply 31. The injector 30 is shown only schematically, in dashed lines, in FIG. 1. An injection damper (not shown) may be inserted into the lower region of the stepped bore 26 in the head 24.

In the cylindrical insert 22, there is also a bore 32, which in the installed position shown in FIG. 1 is coaxial with the bore 20 in the central body 12 and with the stepped bore 26 in the head 24. A piston 34 is guided slidingly in the bore 32. The piston 34 is pressed upward by a helical spring 36. This helical spring is braced at the bottom on a step (not identified by reference numeral) of a stepped bore 38 in an intermediate piece 40. The intermediate piece 40 is received in the lower region of the bore 20 in the central body 12, that is, below the cylindrical insert 22.

Between the top of the piston 34 (in upper terminal position of the piston 34 as shown in FIG. 1) and the head 24, one portion of the stepped bore 26 in the head 24 and one portion of the bore 32 form a measurement chamber 42. This measurement chamber is filled with a test fluid (not shown), typically a test oil, which comes as close as possible to the properties of the fuel to be injected in actual operation by the injector 30. The temperature of the test oil that is located in the measurement chamber 42 is detected by a temperature sensor 44, which is introduced through a bore from obliquely outward through the head 24 as far as the measurement chamber 42.

The piston 34 is embodied as a circular-cylindrical hollow body. A tappet 46 of tubular construction is secured to the lower end wall of the piston 34 and extends downward through the bore 38 in the intermediate piece 40, to beyond the intermediate piece 40. The tappet 46 is sealed off from the lower region of the stepped bore 38 in the intermediate piece 40 via an O-ring seal (not identified by reference numeral). Mounted on the lower end of the tappet 46 is a rodlike extension 48, which extends coaxially to the tappet 46 downward to an inductive travel pickup 50. Instead of the inductive travel pickup mentioned, other kinds of travel pickup may also be employed.

The damping device 14 located below the central body 12 is constructed as follows: In a frame 52, piezoelectric elements 54 are retained on both sides of the tappet 46 or its extension 48, diametrically opposite one another. The piezoelectric elements 54 act with rounded-off final control elements 56 on actuation arms 58. The two actuation arms 58 are each joined, via a thin bridge of material 60 on their lower end, in terms of FIG. 1, to a respective base part 62, which in turn is firmly screwed to the frame 52. The bridge of material 60 thus forms a hinge, which specifies a hinge axis, located perpendicular to the plane of the drawing in FIG. 1, for the corresponding actuation arm 58. However, the bridge of material 60 is stiff enough that the respective actuation arm 58 is prestressed only very slightly counter to the final control element 56 of the respective piezoelectric element 54.

On the upper ends, in terms of FIG. 1, the actuation arms 58 each have a portion aimed at the tappet 46, whose end face 64 oriented toward the tappet 46 is located with a slight spacing from the surface of the tappet 46, in the state of repose shown in FIG. 1. The end face 64 of each actuation arm 58 is embodied as a friction face.

Besides the damping device 14 that has just been described, the apparatus 10 also has an additional damping device 66: It is a flow brake, which is constructed as follows: The space below the lower end face of the piston 34 in the bore 20 of the cylindrical insert 22, the upper region of the stepped bore 38 in the intermediate piece 40, and a tie line leading obliquely outward from this region are all filled with test oil and form a first flow chamber 68. The tie line in the intermediate piece 40 leads to a throttle or baffle 70, located in the central body 12, which is adjustable via an adjusting screw 72. From the baffle 70, a conduit 74 leads upward to a second flow chamber 76, which is bounded at the top by the end face of a piston 80 that is prestressed by a helical spring 78. The flow chamber 76 can be evacuated via a valve 82.

The apparatus 10 further includes a open- and closed-loop control device 84, which may include a programmable computer, which is connected on the input side to the temperature sensor 44 and the inductive travel pickup 50 and on the output side to a magnet valve, not shown, and to the two piezoelectric elements 54.

The apparatus 10 shown in FIG. 1 for measuring the injection quantity of an injection system 30 can also be used, according to the invention, for ascertaining the leakage of the injection system 30, as follows:

At the instigation of the open- and closed-loop control device 84, via the high-pressure test fluid supply, test fluid (not shown) is delivered to the injector 30 and its injection nozzle and is injected into the measurement chamber 42 that is likewise filled with test fluid. Injecting test fluid into the measurement chamber 42 increases the volume of test fluid in the measurement chamber 42. The volume additionally reaching the measurement chamber 42 speeds up the piston 34 downward, counter to the force of the helical spring 36 and counter to the gas pressure below the piston 34.

As a result, the tappet 46 and the extension 48 mounted on it also move, which leads to a measurement signal of the inductive travel pickup 50 that corresponds to the distance travelled by the extension 48. From this measurement signal, in the open- and closed-loop control device 84, in a processing unit not shown but present in the open- and closed-loop control device, the injected test fluid volume is calculated, taking the specific geometric conditions into account.

The quantity of fuel injected by the injection system 30 into the measurement chamber 42 is thus known, and the method according to the invention for testing the tightness of the injection system 30 begins.

For that purpose, the injection system 30 is closed, and a contrary pressure, hereinafter called the injection pressure $p_{test}$, is maintained in the injection system.

If the injection system 30 closes 100% tightly, then no test fluid can get into the injection system 30 from the measurement chamber 42. The same is true for the fluid in the injection system 30 at the test pressure $p_{test}$ in the opposite direction.

Because of the internal leakage of the injection quantity indicator, and in particular the leakage between the piston 34 and the bore 32 in which the piston 34 is guided, as well as any possible leakage at the valve 82, the piston, driven by the contact pressure of the helical spring acting on the piston 34 as well as any gas pressure that may be present and acts on the underside of the piston 34, will move back into its outset position. The measurable distance-time law of the motion of the piston 34 is a measure of the internal leakage in the injection quantity indicator.

Figure 2A:
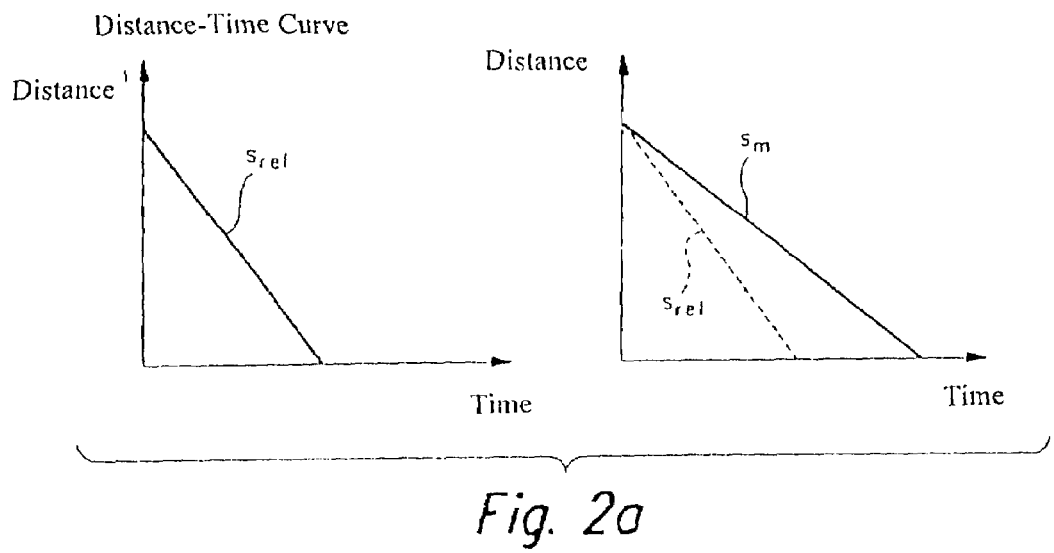
FIG. 2 is a graphical representation of the measurement signal obtained by the method of the invention and a reference value are plotted over time.

In FIG. 2a, the distance-time curve of an injection quantity indicator is shown in a graph on the left. It is assumed that the injection system 30 is tight. This distance-time curve, which is also designated $s_{ref}$ in FIG. 2a, is a straight line with a negative slope.

If an injection system 30 is now connected to the injection quantity indicator 10 that does not close tightly, as is represented in the right-hand part of FIG. 2a, then because of the test pressure $p_{test}$ prevailing in the injection system 30, test fluid is forced out of the injection system 30 into the measurement chamber 42 through the leak. The reason for this is the fact that the test pressure $p_{test}$ is greater than the pressure in the measurement chamber 42. Because of the test fluid flowing into the measurement chamber 42, the distance-time curve for the motion of the piston 34 changes. Based on the same starting value at time t=0, the piston 34 moves more slowly back to its outset position, which is expressed by the lesser negative slope of the measured values $s_m$ compared to the reference values sref, which latter values of course stand for an injection quantity indicator with a tight injection system 30 connected to it.

In the right-hand part of FIG. 2a, the reference values $s_{ref}$ are shown in dashed lines, for illustrating what has been said above.

Figure 2B:
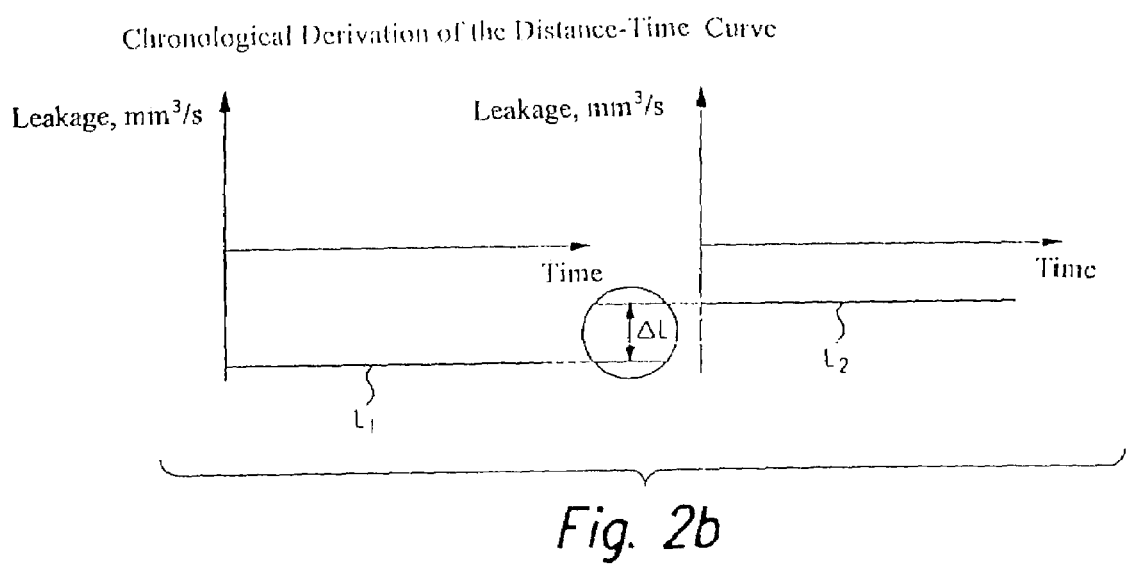

In FIG. 2b, the chronological derivation of the variables shown in FIG. 2a are presented in graph form. The chronological derivation of the distance-time law yields the leakage L in mm³/s. The leakage L has a value $L_1$, in the case of an injection system 30 without leaks (left-hand part of FIG. 2b). In the case of an injection system 30 that does not close tightly, the leakage $L_2$ is less than in the first case, because of the test fluid flowing in as replenishment. The leakage $L_2$ is smaller in amount than the leakage $L_1$. The difference $\Delta L$ between the leakage $L_1$ and the leakage $L_2$ is a measure for the leakiness of the valve. It is understood that the leakiness $\Delta L$ is also dependent on the test pressure $p_{test}$ that prevails in the injection system 30 in the closed state. By ascertaining the leakage $L_2$ at varying test pressures $p_{test}$, further findings can be made about the extent of the leakiness of the injection system 30. In some cases, further information about the type and source of the leakage can also be obtained from the change in the leakage $\Delta L$ as a function of a modified test pressure $p_{test}$.

In a variant of the method described in conjunction with FIG. 2, the tightness of the injection system 30 can also be ascertained by varying the pressure in the injection system 30 or in the measurement chamber 42. By evaluating the measurement signals $s_{m,\,i}$ thus obtained, the tightness of the injection system 30 can also be ascertained by comparing the measurement signals $s_{m,\,i}$ obtained at various pressures.

The foregoing relates to preferred exemplary embodiments of the invention, it being understood that other variants and embodiments thereof are possible within the spirit and scope of the invention, the latter being defined by the appended claims.

The invention claimed is:

1. A method for measuring the leakage from injection systems (30), in particular for internal combustion engines of motor vehicles and in particular in production testing, the method comprising the following steps:
- connecting the injection system (30) to a measurement chamber (42);
- introducing a test fluid into a measurement chamber (42);
- varying the pressure ($p_{test}$) in the injection system (30);
- detecting the motion of a piston (34), defining the measurement chamber (42) at least in some regions, by a detection device (50); and
- evaluating the measurement signals ($s_{m,I}$), furnished by the detection device (50), for each pressure ($p_{test,I}$).

2. A method for measuring the leakage from injection systems (30), in particular for internal combustion engines of motor vehicles and in particular in production testing, the method comprising the following steps:
- connecting the injection system (30) to a measurement chamber (42);
- introducing a test fluid into the measurement chamber (42);
- subsequently detecting the motion of a piston (34), defining the measurement chamber (42) at least in some regions, by a detection device (50);
- evaluating at least one measurement signal ($s_m$), furnished by the detection device (50) while the injection system is closed, by comparison with at least one reference value ($s_{ref}$) to determine the degree of leakage from the closed injection system: and further comprising the step of evaluating a chronological series of the measurement signals ($s_m(t)$) furnished by the detection device (50).

3. The method according to claim 1, wherein the test fluid is introduced from the injection system (30) into the measurement chamber (42).

4. The method according to claim 2, wherein the test fluid is introduced from the injection system (30) into the measurement chamber (42).

5. The method according to claim 1, further comprising the step of evaluating a chronological series of the measurement signals ($s_m(t)$) furnished by the detection device (50).

6. The method according to claim 3, further comprising the step of evaluating a chronological series of the measurement signals ($s_m(t)$) furnished by the detection device (50).

7. The method according to claim 2, wherein the pressure ($p_{test}$) in the injection system (30) is varied, and for each pressure ($p_{test,i}$) at least one measurement signal ($s_{mi}$) furnished by the detection device (50) is evaluated.

8. The method according to claim 3, wherein the pressure ($p_{test}$) in the injection system (30) is varied, and for each pressure ($p_{test,i}$) at least one measurement signal ($s_{mi}$) furnished by the detection device (50) is evaluated.

9. The method according to claim 5, wherein the pressure ($p_{test}$) in the injection system (30) is varied, and for each pressure ($p_{test,i}$) at least one measurement signal ($s_{mi}$) furnished by the detection device (50) is evaluated.

10. The method according to claim 1, wherein the pressure ($p_{test}$) in the injection system (30) is varied, and for each pressure ($p_{test,i}$), a chronological series of the measurement signals ($s_{mi}(t)$) furnished by the detection device (50) is evaluated.

11. The method according to claim 2, wherein the pressure ($p_{test}$) in the injection system (30) is varied, and for each pressure ($p_{test,i}$), a chronological series of the measurement signals ($s_{mi}(t)$) furnished by the detection device (50) is evaluated.

12. The method according to claim 3, wherein the pressure ($p_{test}$) in the injection system (30) is varied, and for each pressure ($p_{test,i}$), a chronological series of the measurement signals ($s_{mi}(t)$) furnished by the detection device (50) is evaluated.

13. The method according to claim 5, wherein the pressure ($p_{test}$) in the injection system (30) is varied, and for each pressure ($p_{test,i}$), a chronological series of the measurement signals ($s_{mi}(t)$) furnished by the detection device (50) is evaluated.

14. The method according to claim 1, wherein the evaluation of the measurement signal or signals ($s_{mi}$) is done by comparison with one or more reference values ($s_{ref}$).

15. The method according to claim 3, wherein the evaluation of the measurement signal or signals ($s_{mi}$) is done by comparison with one or more reference values ($s_{ref}$).

16. The method according to claim 5, wherein the evaluation of the measurement signal or signals ($s_{mi}$) is done by comparison with one or more reference values ($s_{ref}$).

17. A computer program suitable for performing the method according to claim 1, when it is executed on a computer.

18. A computer program suitable for performing the method according to claim 2, when it is executed on a computer.

19. The computer program according to claim 18, wherein the program is stored in a memory, in particular a flash memory.

* * * * *